United States Patent [19]
Ichihara et al.

[11] Patent Number: 5,734,145
[45] Date of Patent: Mar. 31, 1998

[54] LASER MARKING METHOD USING LASER HEATED LIQUID CRYSTAL MASK

[75] Inventors: Masashi Ichihara, Hiratsuka; Akira Mori, Chigasaki; Yukinori Matsumura; Yukihiro Tsuda, both of Isehara, all of Japan

[73] Assignee: Komatsu Ltd., Tokyo, Japan

[21] Appl. No.: 687,472

[22] PCT Filed: Feb. 6, 1995

[86] PCT No.: PCT/JP95/00150

§ 371 Date: Aug. 7, 1996

§ 102(e) Date: Aug. 7, 1996

[87] PCT Pub. No.: WO95/21718

PCT Pub. Date: Aug. 17, 1995

[30] Foreign Application Priority Data

Feb. 8, 1994 [JP] Japan ................ 6-034229

[51] Int. Cl.$^6$ ................................................. B23K 26/06
[52] U.S. Cl. ........................... 219/121.69; 219/121.73; 219/121.85; 349/4; 349/161
[58] Field of Search ................. 219/121.6, 121.68, 219/121.69, 121.73, 121.85; 347/224, 225, 256–261; 349/4, 161; 345/87

[56] References Cited

U.S. PATENT DOCUMENTS

| | | | |
|---|---|---|---|
| 4,093,355 | 6/1978 | Kaplit et al. | 349/161 |
| 4,639,722 | 1/1987 | Urabe et al. | 345/87 |
| 4,734,558 | 3/1988 | Nakano et al. | 219/121.73 |
| 4,818,835 | 4/1989 | Kuwabara et al. | 219/121.6 |
| 5,157,235 | 10/1992 | Okumura et al. | 219/121.68 |
| 5,260,542 | 11/1993 | Ishiguro et al. | 219/121.69 |
| 5,309,273 | 5/1994 | Mori et al. | 219/121.68 |

FOREIGN PATENT DOCUMENTS

| | | | |
|---|---|---|---|
| 5-42379 | 10/1985 | Japan . | |
| 62-206528 | 9/1987 | Japan | 219/121.85 |
| 64-11088 | 1/1989 | Japan . | |
| 2-268988 | 11/1990 | Japan . | |
| 2188748 | 10/1987 | United Kingdom | 219/121.73 |

*Primary Examiner*—Teresa J. Walberg
*Assistant Examiner*—Gregory L. Mills
*Attorney, Agent, or Firm*—Sidley & Austin

[57] ABSTRACT

A method of driving a liquid crystal mask marker increases a marking speed, by reducing the time required for producing an image, and maintains marking accuracy at a high level. For this purpose, a laser beam (L11) is irradiated onto a non-light-permeable portion, such as a non-light-permeable surface and/or a non-liquid-crystal surface, of a liquid crystal mask (8), for example, a liquid crystal electrode member (81), before the liquid crystal mask completes the production of an image when the image is produced on the liquid crystal mask (8).

23 Claims, 3 Drawing Sheets

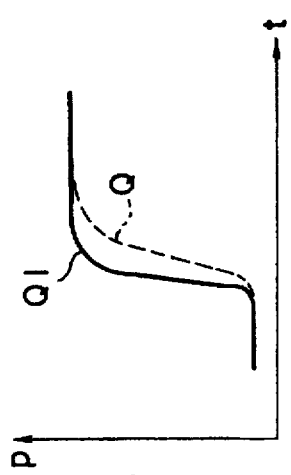
FIG. 6
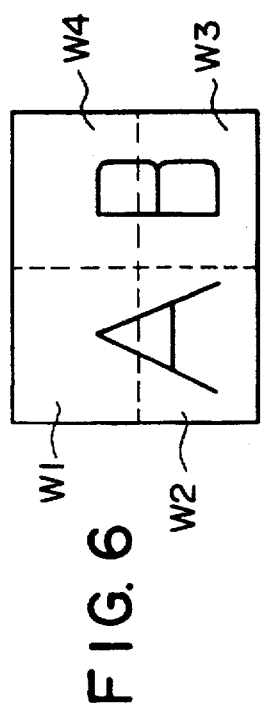
FIG. 8
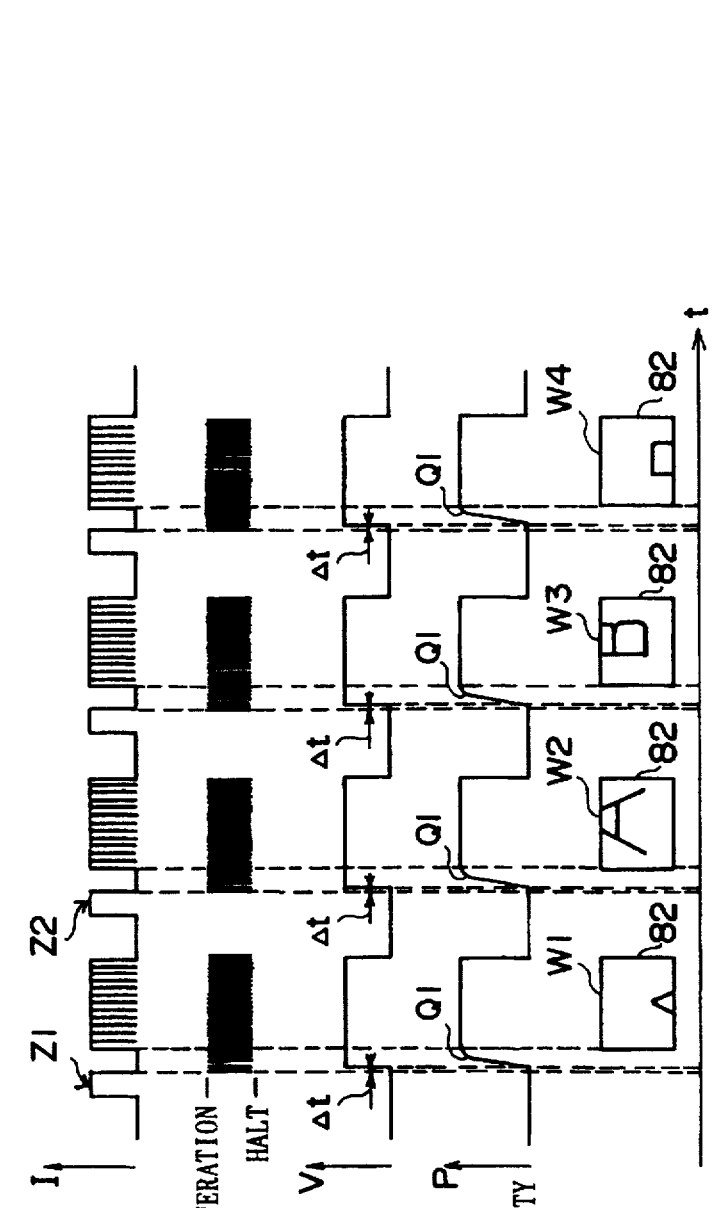
FIG. 7(a) DRIVE OF SCANNING MIRROR 6Y
FIG. 7(b) LASER BEAM L1
FIG. 7(c) IMAGE DISPLAYING VOLTAGE
FIG. 7(d) LIGHT TRANSMITTIVITY
FIG. 7(e) SPLIT IMAGE

LASER MARKING METHOD USING LASER HEATED LIQUID CRYSTAL MASK

TECHNICAL FIELD

The present invention relates to a method of driving a liquid crystal mask marker, and particularly relates to a method of driving a liquid crystal mask marker when the liquid crystal mask produces an image.

BACKGROUND ART

Conventionally, liquid crystal mask markers have been devices for marking an image on a workpiece surface by irradiating a laser beam onto a liquid crystal mask, which has been provided with a pattern to be marked on the workpiece, and by irradiating the transmitted light onto the workpiece surface. These liquid mask markers are broadly divided into a collective irradiation type, which collectively irradiates, for example, an expanded laser beam onto an image, and a raster irradiation type which irradiates a fine laser beam onto an image as the fine laser beam is being deflected by a XY deflector. Though both types have advantages and disadvantages, the raster irradiation type, which has a complicated structure and control program compared to the collective irradiation type, can reduce the size of the laser oscillator, and as a result, can obtain safety at a high level, since a small laser beam intensity can be used, so that the raster irradiation type is considered to be preferred for the future.

As a method of controlling a liquid crystal mask marker, a known method for improving marking accuracy provides that the time for oscillating the laser of a laser oscillator is after the time for applying to the liquid crystal mask a voltage for displaying an image (for example, Japanese Patent Application Laid-open No. 64-1 1088). This method has been proposed, paying attention to the fact that it takes some time for an image to have a specified contrast (hereinafter referred to as "the completion of an image production") when a voltage for displaying an image is applied to the liquid crystal mask, and that marking accuracy is reduced when a laser beam is irradiated onto the image during the voltage application to the liquid crystal mask.

Recently, there has been a demand for a liquid crystal mask marker which can mark on mass-produced products at a high speed and with high accuracy, as seen from the marks such as a production number, a pattern or the like, for example, on an IC board. While the marking accuracy is improved in the aforementioned conventional method of controlling a liquid crystal mask marker, the marking accuracy is improved, but the laser beam is not oscillated until after the liquid crystal mask completes the production of an image; therefore the conventional method of controlling a liquid crystal mask marker has a disadvantage in that the marking speed is not improved.

SUMMARY OF THE INVENTION

The present invention is made in order to eliminate the disadvantage of the conventional art, and an object of the present invention is to provide a method of driving a liquid crystal mask marker which can increase the marking speed while marking accuracy is maintained.

The first aspect of the method of driving a liquid crystal mask marker in accordance with the present invention has a characteristic in that a laser beam is irradiated onto a non-light-permeable portion of the liquid crystal mask, which is a portion other than a liquid crystal surface, such as a non-light-permeable surface and/or a non-liquid-crystal surface of the liquid crystal mask, before the completion of an image production when the image is produced on the liquid crystal mask. The non-light-permeable surface of the aforementioned liquid crystal mask can be a liquid crystal electrode member of the liquid crystal mask.

The aforementioned structure is made by utilizing the fact that the speed, at which the light transmittivity of a liquid crystal rises, increases when the temperature of the liquid crystal rises; that is, the time required for producing an image is shortened when the temperature of the liquid crystal is raised. Then, in order to promote a rise in the temperature of the liquid crystal, the laser beam is irradiated onto a portion which does not transmit light such as the non-light-permeable surface of the liquid crystal mask, etc., before the completion of the image production. The irradiation onto the liquid crystal electrode member of the liquid crystal mask also has the same operation. The present invention can be applied for both the collective irradiation type and the raster irradiation type of liquid crystal mask markers. That is, when the liquid crystal mask produces an image, the laser beam is irradiated onto the non-light-permeable surface of the liquid crystal mask until the liquid crystal mask completes producing the image. It should be mentioned that "a non-light-permeable surface of the liquid crystal mask" refers to "a non-light-permeable surface of the liquid crystal surface", "a non-crystal-surface of the liquid crystal mask" such as an external frame of the liquid crystal mask, etc., and "a liquid crystal electrode member of the liquid crystal mask".

The second aspect of the method of driving the liquid crystal mask marker in accordance with the present invention has a characteristic in that the laser beam is irradiated onto a laser beam absorbent, provided and formed on the liquid crystal surface of the liquid crystal mask or on the liquid crystal mask, before the completion of an image production when the image is produced on the liquid crystal mask.

By the aforementioned structure, an operation, which is the same as for the first aspect, can be obtained, and the time required for producing the image is shortened. The present invention can be applied to both the collective irradiation type and the raster irradiation type of liquid crystal mask markers.

BRIEF DESCRIPTION OF THE DRAWINGS

FIG. 6 is an explanatory view of an example of a four-part split image relating to the first embodiment;

FIG. 7 is a driving timing chart for the driving systems of the controller in the first embodiment; and FIG. 8 is a graph explaining the difference in the states in which an image is produced relating to the first embodiment and the conventional art.

BEST MODE FOR CARRYING OUT THE INVENTION

A preferable embodiment of a method of driving a liquid crystal mask marker of the present invention will be described below with reference to the attached drawings.

Figure 1:
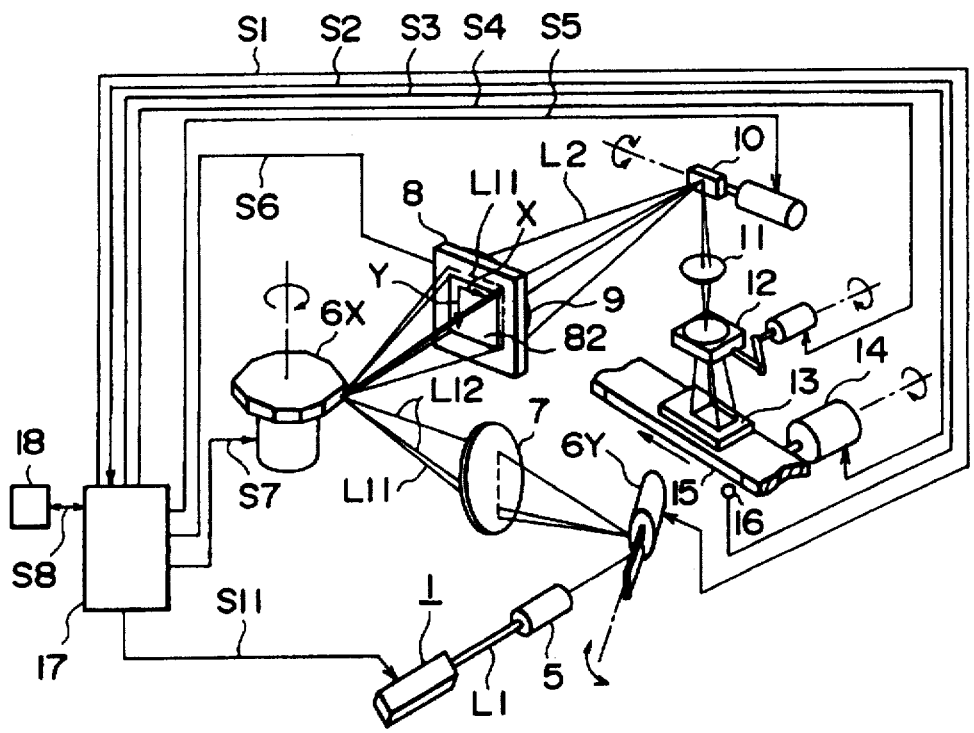
FIG. 1 is a block diagram of the entire body of a raster irradiation type of liquid crystal mask marker relating to the first embodiment of the present invention.

FIG. 1 shows a liquid crystal mask marker, of a raster irradiation type, used in the first embodiment. A laser beam L1, from a YAG laser oscillator 1 with a Q-switch, is condensed by a beam expander 5 onto a scanning mirror 6Y. Then the laser beam L1 is reflected and condensed by a lens 7 onto a polygonal mirror 6X. The laser beam L1 is further reflected here and irradiated to a liquid crystal surface 82 of a liquid crystal mask 8. In the above, the polygonal mirror 6X rotates at a fixed speed and moves the laser beam L1 in a X direction (a line writing direction) on the liquid crystal surface 82. A line feed in a Y direction on the liquid crystal surface 82 can be achieved by rotating the scanning mirror 6Y over a very small angle. It is a raster irradiation that orderly irradiates the laser beam L1 in a XY direction on the liquid crystal surface 82 as described above. In this embodiment, a deflecting machine for the above-described raster irradiation is referred to as a first deflecting machine.

A laser beam L2, transmitted through the liquid crystal surface 82, is condensed by a lens 9 onto a scanning mirror 10. The laser beam L2, which is further reflected here, is condensed by a lens 11 onto a lens 12, and after being further deflected by the lens 12, the laser beam L2 is irradiated onto a workpiece surface 13, on a workpiece feeder 15. Since an image is displayed on the aforementioned liquid crystal surface 82 and the transmitted laser beam L2 contains this image information, the image is marked on the workpiece surface 13. In the above, the scanning mirror 10 and the lens 12 define a second deflecting machine and determine the most suitable irradiation area for the laser beam L2.

Here, the structure of a controller 17, which is a control means for each of the aforementioned driving systems, will be described. Signal lines S1 to S8 and S11 are connected to the controller 17, and the controller 17 conducts synchronous control among each of the aforementioned driving systems. The signal line S1 connects to the driving system of the scanning mirror 6Y of the first deflecting machine and outputs driving and halting signals in order to feed line and return to the origin (return to a heating target line described below). A signal line S2 connects to a position sensor 16 and inputs a position signal of the detected workpiece. A signal line S3 connects to a workpiece feeder driving motor 14 and outputs the signals for driving and for halting the workpiece feeder driving motor 14. A signal line S4 connects to the driving system of the lens 12 of the second deflecting machine and outputs the signals for driving and for halting movement of the lens 12. A signal line S5 connects to the driving system of the scanning mirror 10 of the second deflecting machine and outputs the signals for driving and for halting movement of the scanning mirror 10. A signal line S6 connects to the driving element of the liquid crystal mask 8 and displays and deletes the image, or controls switching voltage. A signal line S7 connects to the driving system of the polygonal mirror 6X of the first deflecting machine and outputs signals for rotating and for halting movement of the polygonal mirror 6X. A signal line S8 is a line for inputting and outputting various kinds of commands to and from an external terminal 18. A signal S11 connects to the laser oscillator 1 and outputs signals for irradiating and for halting the laser and a signal for driving a Q-switch.

As described above, in this liquid crystal mask marker, the first deflecting machine, which is an XY deflecting machine, conducts a raster irradiation of the laser beam L1 onto the image on the liquid crystal surface 82 of the liquid crystal mask 8 to provide a raster irradiation type of liquid crystal mask marker which marks the aforementioned image on the workpiece surface 13 by irradiating the transmitted beam L2 onto the workpiece surface 13.

The operation of the raster irradiation type of liquid crystal mask marker will be described. The controller 17 especially conducts a timing control shown in FIG. 7 to the laser oscillator 1, the first deflecting machines 6X and 6Y, the liquid crystal mask 8, and the second deflecting machine 10 and 12. In the drawing, (a) shows the timing for starting and for halting a driving current I of the scanning mirror 6Y, (b) shows the timing for irradiating and for halting the laser beam L1 of the laser oscillator 1, (c) shows the timing for applying a voltage V, for displaying an image on the liquid crystal mask 8, (d) shows the state in which a light transmittivity P of the image changes, and (e) shows each image segment displayed in FIG. 6 described below.

Figure 2:
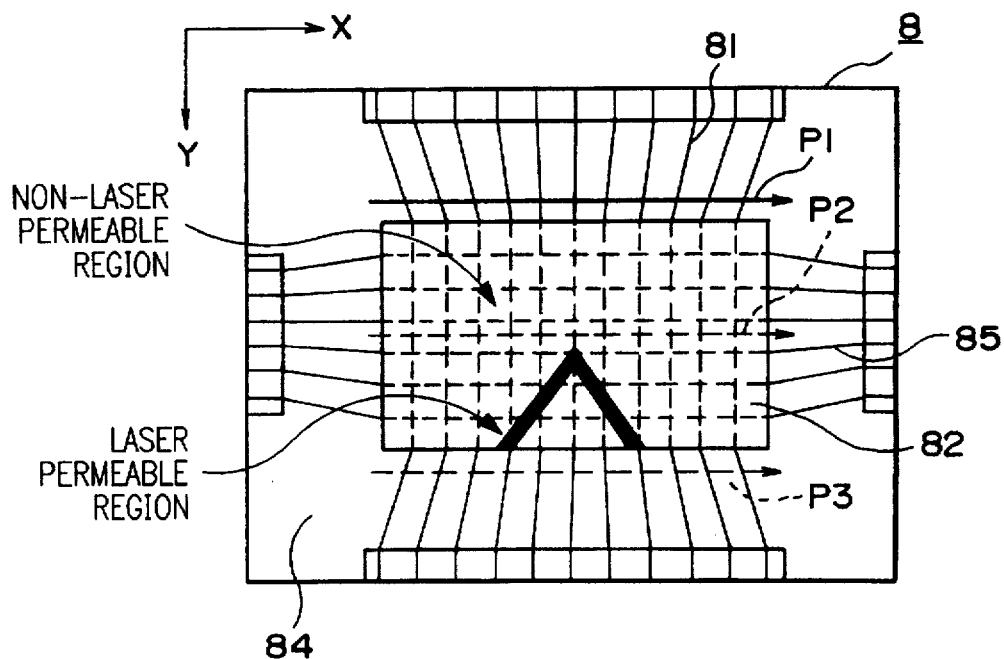
FIG. 2 is a front view of the liquid crystal mask relating to the first embodiment.

FIG. 2 will be now explained. The marks P1, P2, and P3 are target surfaces for irradiation (hereinafter referred to as heating target lines) of a laser beam L11 onto the liquid crystal mask 8. As illustrated in FIG. 1, the aforementioned laser beam L11 is a laser beam previously irradiated onto the non-light-permeable surface of the liquid crystal mask 8 before a raster irradiation of a laser beam L12 for marking is started (that is, before the completion of an image production). Returning to the description of FIG. 2, the aforementioned heating target lines P1, P2, and P3 are in the areas predetermined for every image on the non-light-permeable surface of the liquid crystal mask 8. More specifically, the heating target lines P1 and P3 are provided on an external frame surface 84, which is a non-liquid-crystal surface, of the liquid crystal mask 8. On the other hand, the heating target line P2 is provided within the liquid crystal surface 82 of the liquid crystal mask 8.

As shown, for example, in FIG. 6, an original image is previously split into four image segments W1 to W4, and data for each of the image segments is memorized in the controller 17. As shown in (e) in FIG. 7, the controller 17 shall display the four image segments W1 to W4 onto the liquid crystal mask 8 in that order. The controller 17 composes the four image segments W1 to W4 into the original image and marks it on the workpiece surface 13 by driving the second deflecting machine 10 and 12.

Then the controller 17 drives the scanning mirror 6Y of the first deflecting machine as indicated by the arrow Z1 in (a) of FIG. 7 in order that the laser beam L11 is irradiated onto the heating target line P2 (refer to FIG. 2). Next, as shown in (b) in FIG. 7, when the laser beam L1 is generated by conducting a pulse oscillation of the laser oscillator 1 with a Q-switch, the laser beam L11 is irradiated as the laser beam L11 goes in a X direction within the heating target line P2. This irradiation is conducted at least after the laser beam L11 is set at the irradiating position to the heating target line P2 by driving an optical system before the voltage V, for displaying an image, is applied as shown Δt in (c) in FIG. 7.

Figure 3:
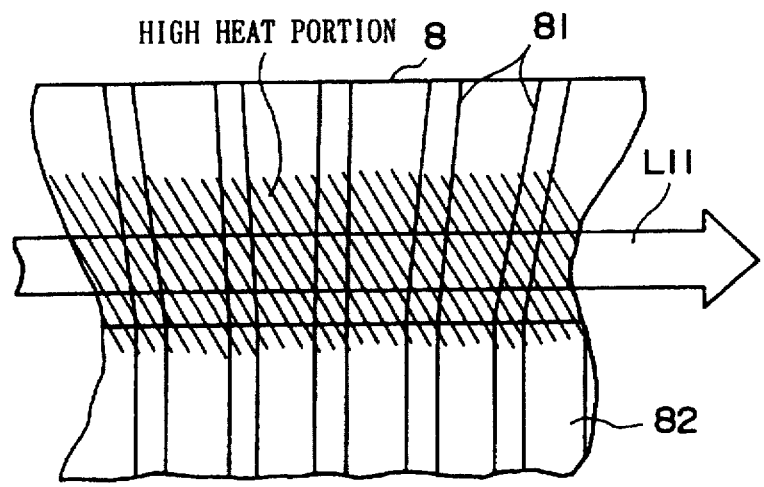
FIG. 3 is a partially enlarged view explaining the thermal state of the liquid crystal mask of FIG. 2 as a result of irradiating the laser beam before the voltage for displaying an image is applied.
Figure 4:
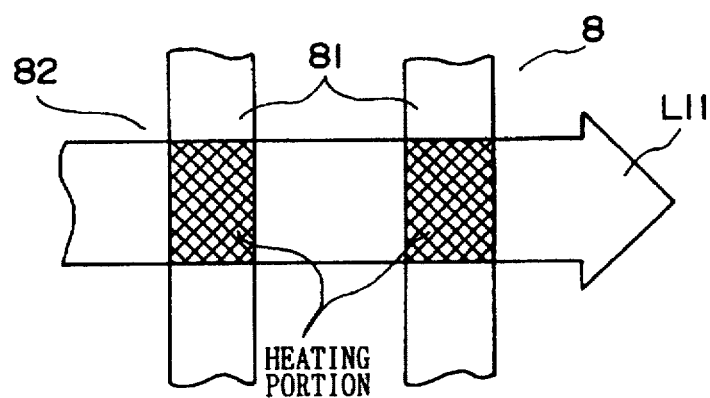
FIG. 4 is a partially enlarged view of the liquid crystal electrode of FIG. 3.

By irradiating the aforementioned laser beam L11 onto the liquid crystal mask 8, a liquid crystal electrode 81 absorbs part of the laser beam L11 and generates heat as shown in FIG. 3 and FIG. 4. This heat transmits to the liquid crystal electrode 81 and diffuses in the liquid crystal mask 8, and thereby the temperature of the liquid crystal rises. Then, as shown in (c) in FIG. 7, the V, for displaying an image segment W1, is applied to the liquid crystal mask 8 (in other words, the production of the image segment is started).

When the liquid crystal mask 8 completes the production of the image segment W1 ((d) in FIG. 7), the raster irradiation of the laser beam L12 from the first irradiation line is conducted with the first deflecting machine 6X and 6Y, and the image W1 is marked on the workpiece surface 13 ((e) in FIG. 7).

It should be mentioned that the aforementioned "first irradiation line" is defined to be "a line including the first light-permeable portion in a Y direction in a certain image". For example, in FIG. 2, it is the line 85 including the apex of a light-permeable portion (the portion painted black in the drawing) of the image segment W1, and the raster irradiation for the image segment W1 is started in a Y direction (downwards) from this line. Accordingly, the heating target line P2 is set on the position above the aforementioned first irradiation line in the drawing as FIG. 2 shows. Since this heating target line P2 is originally non-light-permeable, as seen from the image segment W1, whether it is before the completion of an image production or after the completion of an image production, the previous irradiation of the laser beam L11 to the heating target line P2 as described above does not influence the marking on the workpiece surface 13. The raster irradiation started on the middle line on the liquid crystal surface 82 like this can be easily conducted by the aforementioned first deflecting machine 6X and 6Y. The controller 17 also conducts the aforementioned control.

When the marking of the image segment W1 on the workpiece surface 13 has been completed, the controller 17 drives the second deflecting machine 10 and 12 in order that the transmitted laser beam L2 is directed to the area for marking the next image segment W2. Then the controller 17 will display the next image segment W2 on the liquid crystal surface 82. Unlike the previous image segment W1, this next image segment W2 is an image segment in which a light-permeable portion exists on the first scanning line on the liquid crystal surface 82 as shown in FIG. 6 and (e) in FIG. 7. Accordingly, the controller 17 drives the scanning mirror 6Y of the first deflecting machine as indicated by the arrow Z2 in (a) of FIG. 7 in order that the laser beam L11 is irradiated onto the heating target line P1 in FIG. 2.

The heating target line P1 (refer to FIG. 2) of the next further image segment W3 is also provided on the external frame surface 84 which is a non-liquid-crystal surface since the image segment W3 is the same type as the image segment W2. The heating target line P2 of the last image segment W4 is set on a non-light-permeable surface of the image within the liquid crystal surface 82 in the same way as the heating target line P2 of the image segment W1 is set since the image segment W4 is the same type as the image segment W1. When the raster scanning is conducted from bottom to top along the liquid crystal surface 82, it is preferable that the heating target line P1 and/or the heating target line P2 be set below the image.

The operation and effect of the aforementioned first embodiment will be described. According to the present embodiment, the raster irradiation of the laser beam is conducted to a non-light permeable surface of the liquid crystal mask before the completion of an image production, so that the temperature of the liquid crystal rises. In FIG. 8, which is for explaining the operation by this rise in temperature, the abscissa shows a time t, the ordinate shows a light transmittivity P (that is, the state in which the liquid crystal mask completes production of the image), a production curve Q is of the conventional art, and a production curve Q1 is of the present invention. As seen from the production line Q1 and the production line Q, the time of producing an image in accordance with the present invention is remarkably shortened compared to that of the conventional art. As a concrete example, the time for producing an image which has conventionally taken about 30 milliseconds can be shortened by about 5 to 6 milliseconds by the present invention.

Next, the second embodiment of the method of driving liquid crystal mask marker in accordance with the present invention will be described. In the present embodiment, an object, which generates heat by the laser beam L11 and is other than the liquid crystal electrode 81, is provided at the irradiated position, and the laser beam L11 is irradiated onto the object, while in the aforementioned first embodiment the laser beam L11 is directly irradiated to the external frame surface 84 of the liquid crystal mask 8 when the image segments W2 and W3 are produced.

Figure 5:
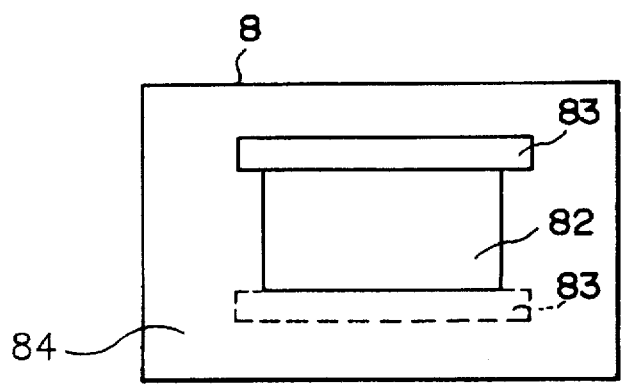
FIG. 5 is a front view of the liquid crystal mask relating to the second embodiment of the present invention.

In FIG. 5, for example, when the laser beam L12 (refer to FIG. 1) is scanning from top to bottom, a laser beam absorbent 83 is provided right above the liquid crystal surface 82. For the laser beam absorbent 83, material absorbing the laser beam L11, such as, for example, the same material as that of the liquid crystal electrode 81 (ITO), aluminum, indium, rhodium, or the like, is used. Or, a mixture of these laser beam absorbent materials and other materials can be used. A laser beam absorbent material selected from the above is put on the surface of the liquid crystal mask 8, or provided between glasses. By the present embodiment heat generation is further enhanced, so that the temperature of the liquid crystal further rises.

As described in the above, the method of driving a liquid crystal mask marker in accordance with the present invention can shorten the time taken to produce an image by increasing the temperature of the liquid crystal before the completion of an image production. Moreover, the laser beam for marking is oscillated after the image is produced, so that the marking accuracy can be maintained at a high level. Further, heating by a heater, etc., which has been conventionally conducted, becomes unnecessary, so that the reliability and the convenience in maintenance are improved.

The method of driving the liquid crystal mask marker in accordance with the present invention has been particularly described in the above; however, the method of driving a liquid crystal mask marker is not limited to the aforementioned embodiments. In the first embodiment, the heating target line is P2 (non-light-permeable surface of the image) in the image segments W1 and W4, while the heating target line is P1 (non-liquid-crystal surface which is a non-light-permeable surface of the liquid crystal mask) in the image segments W2 and W3; however, the heating target line need not be changed for every image like this and all heating target lines can be P1. If all the image segments are of the type of the aforementioned image segments W1 and W4, the heating target line can be unified to be either one of P1 or P2. It should be mentioned that using P2 is more advantageous in view of heat conduction efficiency in this case.

Though the laser beam L11 is irradiated to the area near the display unit in the aforementioned embodiments, the laser beam L11 can be directly irradiated to the liquid crystal display unit when the voltage, for displaying an image on the liquid crystal, is OFF. Further, the liquid crystal mask marker is not necessarily limited to the aforementioned raster irradiation type, and a collective irradiation type can also be suitable. In this case, before marking information is displayed on the liquid crystal mask, the temperature of the liquid crystal is raised by conducting collective irradiation once, and after this, the marking information is displayed and then collective irradiation can be conducted again. Further, when markings are consecutively conducted on a plural number of workpieces, the present invention can be used between the markings on respective workpieces in order to efficiently produce liquid crystal contrast of a marking pattern for the next workpiece.

Efficient production of an image can be achieved by increasing the applied voltage for the image only for a specified time when the image is produced. Then, the control of this applied voltage for an image can be conducted in combination with the aforementioned embodiment, and thereby an image can be more efficiently produced.

INDUSTRIAL APPLICABILITY

The present invention is useful as a method of driving a liquid crystal mask marker in which the time taken to produce an image is shortened and a marking speed is increased by raising the temperature of liquid crystal before the completion of an image production and in which marking accuracy can be maintained at a high level by oscillating the laser beam for marking after the image is produced.

We claim:

1. In a method of using a laser beam and a liquid crystal mask for marking an image on a workpiece surface, wherein said liquid crystal mask has a liquid crystal surface and a non-liquid-crystal surface which are in heat transfer relationship with each other, said liquid crystal surface having a temperature, said method comprising the steps of:

displaying on the liquid crystal surface of said liquid crystal mask an image to be marked on the workpiece surface so that at least a portion of said liquid crystal surface on which said image is thus displayed is rendered permeable to a laser beam, irradiating a laser beam onto the thus displayed image on said liquid crystal surface, and irradiating onto said workpiece surface a laser beam which has been transmitted through said thus displayed image on said liquid crystal surface, the improvement comprising:

irradiating a laser beam onto the non-liquid-crystal surface of said liquid crystal mask to thereby increase the temperature of said liquid crystal surface before the completion of said step of displaying an image.

2. A method in accordance with claim 1, wherein said liquid crystal mask has a plurality of liquid crystal electrode members, and wherein said non-liquid-crystal surface of said liquid crystal mask comprises a portion of at least one of said plurality of liquid crystal electrode members.

3. A method in accordance with claim 1, wherein a laser beam absorbing material is provided on said liquid crystal mask, and wherein said non-liquid-crystal surface of said liquid crystal mask comprises at least a portion of said laser beam absorbing material.

4. A method in accordance with claim 1, further comprising starting said step of irradiating a laser beam onto the thus displayed image on said liquid crystal surface after a completion of an image production on said liquid crystal surface.

5. A method in accordance with claim 1, wherein said laser beam of said step of irradiating a laser beam onto the non-liquid-crystal surface of said liquid crystal mask and said laser beam of said step of irradiating a laser beam onto the thus displayed image on said liquid crystal surface originate from a single laser.

6. In a method of using a laser beam and a liquid crystal mask for marking an image on a workpiece surface, wherein said liquid crystal mask has a liquid crystal surface and a non-liquid-crystal surface which are in heat transfer relationship with each other, said liquid crystal surface having a temperature, said non-liquid-crystal surface including a frame, said method comprising the steps of:

displaying on the liquid crystal surface of said liquid crystal mask an image to be marked on the workpiece surface so that at least a portion of said liquid crystal surface on which said image is thus displayed is rendered permeable to a laser beam, irradiating a laser beam onto the thus displayed image on said liquid crystal surface, and irradiating onto said workpiece surface a laser beam which has been transmitted through said thus displayed image on said liquid crystal surface, the improvement comprising:

irradiating a laser beam onto the non-liquid-crystal surface of said liquid crystal mask to thereby increase the temperature of said liquid crystal surface before the completion of said step of displaying an image.

7. In a method of using a laser beam and a liquid crystal mask for marking an image on a workpiece surface, wherein said liquid crystal mask has a liquid crystal surface and a non-liquid-crystal surface, said liquid crystal surface having a temperature, said method comprising the steps of:

displaying on said liquid crystal surface of said liquid crystal mask an image to be marked on the workpiece surface, wherein at least a first portion of said liquid crystal surface on which said image is thus displayed is permeable to a laser beam and at least a second portion of said liquid crystal surface on which said image is thus displayed is non-permeable to a laser beam as a result of the displaying of said image on said liquid crystal surface, irradiating a laser beam onto the thus displayed image on said liquid crystal surface, and irradiating onto said workpiece surface a laser beam which has been transmitted through said thus displayed image on said liquid crystal surface, the improvement comprising:

discriminating said first portion of said liquid crystal surface from said second portion of said liquid crystal surface based on an image to be displayed; and irradiating a laser beam onto said liquid crystal mask so as to avoid any irradiating of said first portion of said liquid crystal surface based on said discriminating step, before said step of displaying an image is started, so that the temperature of said liquid crystal surface during said step of displaying an image is increased.

8. A method in accordance with claim 7, wherein said step of displaying an image comprises applying a voltage to said liquid crystal mask to change a light transmittivity of said liquid crystal surface to thereby produce a display of said image, and wherein said step of irradiating a laser beam onto said liquid crystal mask comprises irradiating a laser beam onto said liquid crystal mask so as to avoid any irradiating of said first portion of said liquid crystal surface based on said discriminating step, prior to the step of applying a voltage to said liquid crystal mask so that the temperature of said liquid crystal surface during change of the light transmittivity of said liquid crystal surface is increased.

9. A method in accordance with claim 8, wherein said step of irradiating a laser beam onto said liquid crystal mask comprises irradiating a laser beam onto said second portion of said liquid crystal surface.

10. A method in accordance with claim 9, wherein said second portion of said liquid crystal surface is non-permeable to a laser beam during the step of irradiating a laser beam onto the thus displayed image on said liquid crystal surface.

11. A method in accordance with claim 8, wherein said step of irradiating a laser beam onto said liquid crystal mask comprises irradiating a laser beam onto a non-liquid-crystal surface of said liquid crystal mask.

12. A method in accordance with claim 8, wherein said liquid crystal mask has a plurality of liquid crystal electrode members, and wherein said second portion of said liquid crystal surface comprises a portion of said plurality of liquid crystal electrode members.

13. A method in accordance with claim 8, wherein a laser beam absorbing material is provided on said liquid crystal surface wherein said laser beam absorbing material absorbs a laser beam, and wherein said step of irradiating a laser beam onto said liquid crystal mask comprises irradiating at least a portion of said laser beam absorbing material.

14. A method in accordance with claim 7, wherein said step of displaying an image comprises applying a voltage to said liquid crystal mask to change a light transmittivity of said liquid crystal surface to thereby produce a display of said image, and said step of irradiating a laser beam onto said liquid crystal mask comprises irradiating a laser beam onto said liquid crystal mask from prior to the step of applying a voltage to said liquid crystal mask until a completion of change in said light transmittivity of said liquid crystal surface as a result of said step of applying a voltage to said liquid crystal mask, so that the temperature of said liquid crystal surface during change of said light transmittivity of said liquid crystal surface is increased.

15. A method in accordance with claim 14, further comprising starting said step of irradiating a laser beam onto the thus displayed image on said liquid crystal surface after said completion of change in said light transmittivity of said liquid crystal mask.

16. A method in accordance with claim 14, wherein said step of irradiating a laser beam onto said liquid crystal mask comprises irradiating a laser beam onto said second portion of said liquid crystal surface.

17. A method in accordance with claim 14, wherein said step of irradiating a laser beam onto said liquid crystal mask comprises irradiating a laser beam onto a non-liquid-crystal surface of said liquid crystal mask.

18. A method in accordance with claim 14, wherein said liquid crystal mask has at least one liquid crystal electrode member, and wherein said second portion of said liquid crystal surface comprises at least a portion of one of said at least one liquid crystal electrode member.

19. A method in accordance with claim 14, wherein a laser beam absorbing material is provided on said liquid crystal mask, wherein said laser beam absorbing material absorbs a laser beam incident thereon, and wherein said step of irradiating a laser beam onto said liquid crystal mask comprises irradiating a laser beam onto at least a portion of said laser beam absorbing material.

20. A method in accordance with claim 7, wherein said step of irradiating a laser beam onto said liquid crystal mask is discontinued prior to the step of irradiating a laser beam onto the thus displayed image on said liquid crystal surface.

21. A method in accordance with claim 7, wherein said laser beam of said step of irradiating a laser beam onto said liquid crystal mask and said laser beam of said step of irradiating a laser beam onto the thus displayed image on said liquid crystal surface originate from a single laser.

22. In a method of using a laser beam and a liquid crystal mask for marking an image on a workpiece surface, wherein said liquid crystal mask has a liquid crystal surface and a non-liquid-crystal surface, said liquid crystal surface having a temperature, said non-liquid-crystal surface including a frame, said method comprising the steps:

displaying on said liquid crystal surface of said liquid crystal mask an image to be marked on the workpiece surface, wherein at least a first portion of said liquid crystal surface on which said image is thus displayed is permeable to a laser beam and at least a second portion of said liquid crystal surface on which said image is thus displayed is non-permeable to a laser beam as a result of the displaying of said image on said liquid crystal surface, wherein said step of displaying an image comprises applying a voltage to said liquid crystal mask to change a light transmittivity of said liquid crystal surface to thereby produce a display of said image, irradiating a laser beam onto the thus displayed image on said liquid crystal surface, and irradiating onto said workpiece surface a laser beam which has been transmitted through said thus displayed image on said liquid crystal surface, the improvement comprising:

discriminating said first portion of said liquid crystal surface from said second portion of said liquid crystal surface based on an image to be displayed; and irradiating a laser beam onto at least a portion of the frame of said liquid crystal mask so as to avoid any irradiating of said first portion of said liquid crystal surface based on said discriminating step, prior to the step of applying a voltage to said liquid crystal mask so that the temperature of said liquid crystal surface during change of the light transmittivity of said liquid crystal surface is increased.

23. In a method of using a laser beam and a liquid crystal mask for marking an image on a workpiece surface, wherein said liquid crystal mask has a liquid crystal surface and a non-liquid-crystal surface, said liquid crystal surface having a temperature, said non-liquid-crystal surface including a frame, said method comprising the steps of:

displaying on said liquid crystal surface of said liquid crystal mask an image to be marked on the workpiece surface, wherein at least a first portion of said liquid crystal surface on which said image is thus displayed is permeable to a laser beam and at least a second portion of said liquid crystal surface on which said image is thus displayed is non-permeable to a laser beam as a result of the displaying of said image on said liquid crystal surface, wherein said step of displaying an image comprises applying a voltage to said liquid crystal mask to change a light transmittivity of said liquid crystal surface to thereby produce a display of said image, irradiating a laser beam onto the thus displayed image on said liquid crystal surface, and irradiating onto said workpiece surface a laser beam which has been transmitted through said thus displayed image on said liquid crystal surface, the improvement comprising:

discriminating said first portion of said liquid crystal surface from said second portion of said liquid crystal surface based on an image to be displayed; and irradiating a laser beam onto at least a portion of the frame of said liquid crystal mask, from prior to the step of applying a voltage to said liquid crystal mask until a completion of change in said light transmittivity of said liquid crystal surface as a result of said step of applying a voltage to said liquid crystal mask, while avoiding any irradiating of said first portion of said liquid crystal surface based on said discriminating step, so that the temperature of said liquid crystal surface during said step of displaying an image is increased.

* * * * *